(12) United States Patent
Rosen

(10) Patent No.: US 12,391,337 B2
(45) Date of Patent: Aug. 19, 2025

(54) WATER SPORTS DEVICE

(71) Applicant: ROSEN SWISS AG, Stans (CH)

(72) Inventor: Hermann Rosen, Kastanienbaum (CH)

(73) Assignee: Rosenxt Holding AG, Stans (CH)

( * ) Notice: Subject to any disclaimer, the term of this patent is extended or adjusted under 35 U.S.C. 154(b) by 554 days.

(21) Appl. No.: 17/755,579

(22) PCT Filed: Nov. 2, 2020

(86) PCT No.: PCT/EP2020/080701
§ 371 (c)(1),
(2) Date: May 2, 2022

(87) PCT Pub. No.: WO2021/084131
PCT Pub. Date: May 6, 2021

(65) Prior Publication Data
US 2022/0388607 A1 Dec. 8, 2022

(30) Foreign Application Priority Data
Nov. 1, 2019 (DE) .......................... 102019129571.8

(51) Int. Cl.
*B63B 1/24* (2020.01)
*B63B 1/28* (2006.01)
(Continued)

(52) U.S. Cl.
CPC .............. *B63B 1/246* (2013.01); *B63B 1/28* (2013.01); *B63B 32/10* (2020.02); *B63B 32/60* (2020.02);
(Continued)

(58) Field of Classification Search
CPC .......... B63H 1/14; B63H 21/21; B63H 21/17; B63B 79/10; B63B 32/60; B63B 32/10;
(Continued)

(56) References Cited

U.S. PATENT DOCUMENTS 2,749,870 A   6/1956   Vavra
5,722,864 A   3/1998   Andiarena
(Continued)

FOREIGN PATENT DOCUMENTS

CN   108945334 A   12/2018
CN   208715455 U    4/2019
(Continued)

OTHER PUBLICATIONS

Wetboard; iCrowdNewswire; Jun. 30, 2017. URL: https://icrowdnewswire.com/2017/06/30/wetboard-the-worlds-first-electric-powered-water-ski-wakeboard-hybrid/.

*Primary Examiner* — Stephen P Avila
(74) *Attorney, Agent, or Firm* — Husch Blackwell LLP

(57) ABSTRACT

A water sports device is provided, and includes at least one propulsion device which has at least one motor. The motor can be controlled by a control unit and is provided for propelling the water sports device. The parts of the propulsion device are arranged on sides of the foil and/or retaining device or—if separate connection elements are arranged between these two devices—between these two devices, and can be moved with the foil device from a starting and/or resting position into the operating position and back. In order to propel or pull the water sports device, the device has its own propulsion device. This is part of the retaining and/or foil device, which can move relative to the floating body, in that at least one propulsion element in the form of a propeller or impeller accelerating water against the principal direction of movement is moved with the respective device (retaining and/or foil device).

30 Claims, 9 Drawing Sheets

(51) Int. Cl.

| | |
|---|---|
| *B63B 32/10* | (2020.01) |
| *B63B 32/60* | (2020.01) |
| *B63B 79/10* | (2020.01) |
| *B63H 1/14* | (2006.01) |
| *B63H 21/17* | (2006.01) |
| *B63H 21/21* | (2006.01) |
| *H02K 1/27* | (2022.01) |
| *H02K 7/08* | (2006.01) |

(52) U.S. Cl.
CPC ............... *B63B 79/10* (2020.01); *B63H 1/14* (2013.01); *B63H 21/17* (2013.01); *B63H 21/21* (2013.01); *H02K 1/27* (2013.01); *H02K 7/08* (2013.01)

(58) Field of Classification Search
CPC . B63B 1/246; B63B 1/28; H02K 1/27; H02K 7/08
See application file for complete search history.

(56) References Cited

U.S. PATENT DOCUMENTS

| | | | |
|---|---|---|---|
| 10,308,336 | B1 | 6/2019 | Vermeulen |
| 10,322,787 | B2 * | 6/2019 | Ward ..................... B63H 25/04 |
| 2014/0134900 | A1 | 5/2014 | Derrah |
| 2018/0072383 | A1 | 3/2018 | Montague et al. |
| 2020/0010162 | A1 | 1/2020 | Aoki et al. |

FOREIGN PATENT DOCUMENTS

| | | |
|---|---|---|
| DE | 102015103553 A1 | 9/2016 |
| EP | 3214521 A1 | 9/2017 |
| WO | 2020042299 A1 | 3/2020 |

* cited by examiner

WATER SPORTS DEVICE

CROSS REFERENCE

This application claims priority to PCT Application No. PCT/EP2020/080701, filed Nov. 2, 2020, which itself claims priority to German Patent Application No. 10 2019 129571.8, filed Nov. 1, 2019, the entirety of both of which is hereby incorporated by reference.

FIELD OF THE INVENTION

The present invention relates to a water sports device, especially a foilboard, having a floating body, preferably in the form of a floating board, and a foil device, which is secured to the floating body by means of a retaining device, wherein the foil device arranged on a link of the retaining device has at least one, preferably at least two foils and the foil device can be transferred via the retaining device from a resting and/or starting position into an operating position below the floating body, wherein the floating body in the operating position and during a forward movement can be moved by an uplift force produced by the foil device into a position in which it is distant from a water surface.

Such a water sports device is designed in particular as a foilboard, and the floating body is designed in particular as a floating board. The at least one foil device has in particular at least two foils. Such water sports devices usually serve for moving persons over bodies of water, for which purpose the persons hold onto the side of the floating body facing away from the foil device. During the movement, the foil device is usually situated below the water surface.

BACKGROUND OF THE INVENTION

From DE 10 2015 103 553 A1 there is known a water sports device having a foil device also designated as a foil, which can fold up opposite the direction of movement in the event of an underwater contact in order to avoid damage. Further, from US 2018/0072383 A1 there is known a foil device which can be moved by an adjustable angle of the connection strut between the floating body and the propulsion device from a first operating position into another operating position. Both water sports devices of the prior art require sufficiently deep waters for their use, for otherwise the foil device will touch the bottom and either become damaged or be folded up. For transport, the foil device is either disassembled or the water sports device must be transported with the foil device sticking out, usually up to one meter.

BRIEF SUMMARY OF THE INVENTION

The problem which the invention proposes to solve is to provide a water sports device which is easier to handle, with good reliability.

According to the invention, the water sports device comprises at least one, preferably precisely one propulsion device which has at least one motor designed preferably as an internal rotor motor, which can be controlled by means of a control unit and which is provided for propelling the water sports device and which is designed in particular at least partially as part of the foil and/or retaining device or arranged on one of these or between these. The parts of the propulsion device arranged on sides of the foil and/or retaining device or—if separate connection elements are arranged between these two devices—between these two devices can be moved with the foil device from a starting and/or resting position into the operating position and back, especially by being folded or telescoping. Instead of the use of sails or motorboats, for example, in order to propel or pull the water sports device, the device has its own propulsion device. This is part of the retaining and/or foil device, which can move relative to the floating body, in that at least one propulsion element in the form of a propeller or impeller accelerating water against the principal direction of movement is moved with the respective device (retaining and/or foil device). The water sports device can be set down already in knee-deep water, for example, near the shore or beach and be driven by means of the propulsion device toward deeper water. As soon as sufficiently deep water has been reached, the foil device can be moved, especially by means of a drive, into the operating position further away from the floating body. Preferably, the water sports device is designed so that the propulsion device continues to provide propulsion during the transition of the foil device from the resting and/or starting position into the operating position and the movement of the water sports device does not slow down.

Thanks to the arrangement of the propulsion device in particular in the immediate proximity of the foils, an especially stable attitude of the water sports device is achieved. In particular, thanks to the arrangement of the propulsion device, an interruption in the propulsion as the floating body lifts off from the water surface is avoided.

The floating body is in particular a flat, elongated body, the density of which is significantly less than that of water. In particular, the floating body is configured such that it is in any case partly situated above the water surface in operation, preferably regardless of a speed of movement. In operation, the retaining device reaches from the floating body to the foil device beneath the floating body. An uplift force generated by the foil device is transferred by the retaining device to the floating body. In particular, it has the shape of a surfboard.

In the resting and/or starting position, the foil device is situated closer to the floating body than in the operating position to provide a greater compactness of the water sports device. In particular, portions of the retaining and/or foil device which are distant from the floating body in the operating position can be arranged in the resting and/or starting position partially in at least one recess of the floating body. In particular, the retaining device is folded up and/or telescopically retracted for the transfer of the foil device into the resting and/or starting position. In particular, the at least one first link is swiveled, for the transfer of the foil device, by at least 20°, preferably by at least 40°, especially preferably by at least 80° relative to the floating body. Preferably, the foils in the resting and/or starting position are spaced not more than 50 cm from the floating body, in a side view.

The at least one link is configured in particular as a rigid strut. In particular, the link has a swivel mounting relative to the floating body and/or relative to the foil device. Alternatively or additionally, the at least one first link is movable in translation relative to the floating body and/or relative to the foil device, in particular, it is movably mounted. The foil device is coupled in particular indirectly, across further components such as links, or directly to the first link. The link is in general a movably and in particular articulatedly attached, but otherwise rigid component, solid or hollow, such as a rod, by which portions of the water sports device can be moved relative to each other, possibly in combination with one or more further links. Preferably, the retaining device comprises links which can swivel relative to each other and/or can be displaced into or onto each other, such as telescopic links.

The foil device is preferably provided with at least one foil at least in the operating position, being flat and preferably at least partially wing or fin shaped. The width of the foil device measured transversely to the direction of movement is in particular at most twice as large as the width of the floating body. The foil device serves for stabilizing the ride with the water sports device as well as for generating an uplift force, and in order to enhance these effects the foil device preferably has lateral foil ends which are angled relative to the substantially flat water surface. Preferably, in order to enhance these effects the water sports device has a plurality of foils spaced apart from each other in the direction of movement and/or projecting with different distances from the floating body. Thus, the foil device comprises at least one foil and its retention device, as well as optionally a propulsion device.

In order to allow the operator to act upon the propulsion device, the water sports device and especially the propulsion device comprises a control unit. This can include a motor controller or in addition only relay control signals to the motor controller. In particular, the communication with the motor controller can be mediated by a bus system. The control unit in particular comprises conventional means for the control of the propulsion device, such as a man/machine interface, electrical and/or electronic data processing means, as well as interfaces to any functional systems which are present, such as sensors.

Preferably the propulsion device comprises at least one shaftless and/or hubless impeller or propeller, wherein in particular the impeller is arranged at least partially in a flow duct of a propulsion body connected by at least two openings to the surroundings. In this way, the propulsion device is especially suitable for operation near the shore or beach, since on the one hand the risk of injury is significantly reduced thanks to the arrangement in a flow duct, and on the other hand any growth of algae or the like is substantially less in the flow duct and especially on the impeller.

The hubless or shaftless impeller is thus driven by the motor, configured as an internal rotor motor, and in particular it is designed with this as a structural unit, so that the rotor of the motor is part of the impeller, in particular.

In particular, the motor has a hollow rotor, forming with its inner side the flow duct and mounted outside the flow duct in particular on its outer side facing away from the flow duct, carrying blades, as well as an external stator, arranged in a propulsion body housing. Important functional parts of the motor are thus arranged around the cooling duct, so that unlike the case with a propeller having a hub or shaft, the excess heat produced can be dissipated across a larger surface into the flow duct and at the same time better dissipated to the outside, especially when the propulsion body housing is cylindrical or torpedo-shaped. In one embodiment of the invention with a propulsion device having an electric motor configured in particular as an internal rotor motor, this can therefore have an especially streamlined shape. In the case of a propulsion device with a combustion engine, on the other hand, an especially high efficiency is achieved along with good performance.

Preferably, the rotor comprises permanent magnets, which are held on the rotor by or across a bearing ring. The bearing ring can preferably be pushed onto the rotor in the direction of the axis of rotation or is pushed onto it during operation, so that the permanent magnets are positioned in the axial direction between the bearing ring and at least one shoulder of the rotor. The permanent magnets have in particular inner and outer surfaces in the form of cylindrical segments, so that the permanent magnets are incorporated in the underwater motor module in especially space-saving manner and make possible a high efficiency for the motor.

According to another embodiment of a water sports device according to the invention, a sideways projecting housing wall of the propulsion body housing or a propulsion body housing forms a water inlet. Thus, the propulsion device can extend further in the direction of movement and provide design space there, e.g., for a propulsion energy accumulator. At the same time, the arrangement of the propulsion device in the rest of the foil device is improved, since the water being moved need not necessarily be brought into the propulsion device from the front. A sideways projecting housing wall is a region protruding beyond the outer circumference of adjoining regions of the propulsion body housing, i.e., the actual housing of the propulsion device.

Preferably at least a portion of the propulsion device, namely, especially a propulsion body housing, is secured to a mount of the foil device, so that an easy replacement is made possible for repair or charging purposes of a propulsion energy accumulator contained in the propulsion device, such as a storage battery. In particular, the impeller of the propulsion device is arranged in a corresponding flow duct in the propulsion body housing.

In particular, a water sports device according to the invention has a recess in the propulsion body housing, which is covered by a handle of the propulsion device preferably in a watertight manner. In this way, access is made possible for example to a motor controller or parts of the control unit or a charging terminal for charging a storage battery. Preferably, the water sports device according to the invention is thus characterized by an electric terminal or inductive terminal zone for charging a propulsion energy accumulator. In the case of an inductive terminal zone, the recess with its cover can be eliminated. Of course, a propulsion energy accumulator can also provide energy to other consumers, such as sensors or a drive to move the retaining device. In particular, for this purpose at least one of the links of the retaining device comprises at least one corresponding conductor if the propulsion energy accumulator is arranged on sides of the foil device or as part of this or at least at a distance from the floating body and the drive is arranged at the side with the floating body.

Especially for cooling purposes, it is advantageous for the propulsion energy accumulator also forming an outer contour of the water sports device and especially the propulsion device to be removably secured to the rest of the water sports device, especially the propulsion device. Removal of the entire propulsion device is unnecessary, and instead only the storage battery is to be replaced. This, or its individual modules, can be arranged in particular in a removable front part of the propulsion device, especially in the shape of a hollow cylinder or torpedo, and cooled via the wall of the corresponding housing. Preferably, this part is located in front of a motor with the impeller in the direction of movement and thus is not influenced by the waste heat of that motor.

A device according to the invention is furthermore safer for the user to operate when, according to a further modification, it has an accumulator sensor to monitor the propulsion energy accumulator, and the water sports device is designed to reduce the power or switch off the propulsion device based on the signal of the accumulator sensor. In this way, for example, a low discharging of the storage battery can be avoided and the user will be informed of the need to return to an operating station before the propulsion energy has been used up.

Preferably, the water sports device according to the invention comprises a communication unit arranged in or on the floating body, with which signals, especially voice and/or control signals can be transmitted between, e.g., users of several water sports devices according to the invention or an operating station or base and the water sports device. The communication unit in this case is part of the control unit in particular.

The propulsion device and thus the water sports device can be operated preferably both in the resting and/or starting position and in the operating position, so that different skill levels of the users can be taken into account.

A water sports device which is more compact in the resting and/or starting position and thus better for transport purposes, as well as being more operable in particular in shallow waters, is realized when the floating body comprises at least one propulsion body housing mount and/or recesses for the retaining and/or foil device, and at least portions of the retaining and/or foil device and/or the propulsion device can be arranged in this mount or recess.

The stability, speed and/or maneuverability of a water sports device according to the invention is improved when, according to another embodiment, two propulsion devices preferably situated next to each other at the same height are present, especially when a wing of the foil device—at least in a top view looking down on the corresponding portion of the water sports device—extends between the two propulsion devices.

The retaining device can be secured in this case by a central link on the foil and/or by links which are directly hinged to the propulsion devices or corresponding mounts.

Various possibilities exist for the arrangement of the control unit. However, these are arranged at least partially in or on the retaining or foil device and/or in the propulsion body housing, so that any parts producing waste heat can be better cooled.

Preferably, the propulsion device comprises at least one sensor, preferably a plurality of sensors from a group made up of gyro sensors, velocity sensors, position sensors (GPS, Glonass, Beidou etc.), distance sensors, i.e., sensors to detect the distance from objects or structures (especially ultrasound, echo sounder, sonar), infrared sensors and tilt sensors. The outfitting of the water sports device with one or more such sensors makes it possible to produce an "intelligent" water sports device, making its use not only more understandable, thanks to storage of the sensor data in a corresponding memory, but also in particular more comfortable, easy, and safe. For example, a position sensor can be used to track the course of travel, a velocity sensor to adjust the retaining device and/or at least parts of the foil device, tilt sensors to balance the water sports device in an operating position, and infrared sensors to detect persons in the vicinity. Depending on the sensor data, the water sports device can make automatic adjustments, e.g., to the speed of movement, the height above the water surface, or the position of the retaining device. Conversely, depending on the height above the water surface, the speed can also be adjusted. For one or more of these processes, the control unit is designed to process the signals of the sensors, especially to produce control signals. Of course, the control unit will have appropriate data processing means, operational energy accumulators (especially one or more storage batteries or fluid energy accumulators) and communication means, including a man/machine interface, for this.

According to a further modification of the invention, the retaining device comprises a drive, which is preferably designed as an electro-mechanical or electro-pneumatic drive, by which the foil device can be moved from a resting and/or starting position into the operating position and/or from the operating position into the resting and/or starting position, in particular, it can be retracted and extended and/or folded. The activation can be done manually by a person using the water sports device with the advantage of easier transportability of the water sports device as compared to traditional foilboards in the resting or starting position of the foil device close to or also at least partially in the floating body. In particular, the water sports device can be set down already in knee-deep water, for example, near the shore or beach and be driven there toward deeper water. As soon as sufficiently deep water has been reached, the foil device can be moved by means of the drive into the operating position further away from the floating body. This process can be done automatically upon reaching a predeterminable or set water depth or by the person using the water sports device initiating the process.

The transfer into the resting and/or starting position can also occur by taking up intermediate positions in which the foil device is not so close to the floating body as it is in the resting and/or starting position. For the triggering of the actuation, the drive is provided with a control device, which receives a signal triggered by a user and relays a control signal to the drive. The control device in particular is part of the control unit.

An electro-pneumatic drive has electrically energized components for the adjustment of pneumatic actuators. In particular, pressurized air is controlled by electrical signals. Electro-mechanical drives are characterized by generating mechanical processes, such as the turning of a shaft by an electrically operated motor. These forms of drives ensure a low fault vulnerability of the water sports device. In particular, the drive is thus provided with an electric motor, the driving energy of which is used to move the foil device.

Preferably, the drive comprises an energy accumulator, especially one for storing mechanical energy, which when released provides the energy needed for the retracting and extending or folding of the link. For example, the energy accumulator comprises a storage cell for storage of electrical energy, a tank for storage of a pressurized fluid, or especially a mechanical energy accumulator such as a spring. In a first embodiment of the invention, the energy accumulator is designed to energize a drive motor, which initiates the transfer of the foil device. In a preferred further embodiment of the invention, the energy accumulator releases stored energy for the transfer directly, without an intermediate drive motor being involved, as mechanical or kinetic energy. Preferably, the energy accumulator is coupled mechanically on the one hand to the retaining device and on the other hand directly or indirectly to a charging device, such as a drive motor, which is designed to charge the energy accumulator, especially during the use of the water sports device.

Preferably, the drive comprises a gear unit, especially one designed as a step-up gear unit, by which a drive motor of the drive of the retaining device is connected to the energy accumulator, especially such that the quotient of the time required for the folding (dividend) and the time required for the corresponding tensioning (divisor) is less than 1. By the combination of a drive motor and a gear unit the available design space can be better utilized, since the gear unit and the drive motor can be designed coaxially, in particular, and better arranged in the low design height of a boardlike floating body. Furthermore, the drive motor can be smaller in dimension if the torque put out by it is stepped up through the gear unit. In particular, with this combination, a mechanical energy accumulator can be charged and in particular pretensioned for a given time, and is able to put out its stored energy more quickly for the movement of the foil device. Thus, for example, during travel over shallower water the energy accumulator can be charged for a time, such as one or two minutes, and then upon moving into deeper water the energy stored in the energy accumulator is used to transfer the foil device within thirty seconds from the resting and/or starting position into the operating position.

An especially compact design results when, according to a further embodiment of the invention, the drive motor, the gear unit, the energy accumulator and/or a braking device yet to be described below are configured coaxial, especially coaxial with a swivel axis of the link. Especially preferably, the drive motor, the gear unit, and/or the energy accumulator, especially one in the form of a rotary spring, are arranged coaxially with each other and in a cavity of a likewise swiveling rotary housing, which is connected directly or indirectly to a link of the retaining device for the moving of the latter. In this case, the rotary spring can in turn be arranged around the drive motor and the gear unit, in order to utilize the available design space. Its extension, especially in the transverse direction of a floating body configured as a floating board for a foilboard, is significantly larger than in the vertical direction, so that a properly dimensioned rotary or spiral spring, the length of which in the direction of a longitudinal center axis is in particular larger than its width, can encompass a comparatively slender drive motor.

For the movement from a first position to another position and vice versa, preferably the energy accumulator having at least one spring can be tensioned by the drive motor or the drive motor and the gear unit in opposite directions.

Preferably, the retaining device comprises a braking device, especially one that is electro-magnetic or electro-magnetically activated, which blocks, releases, and/or brakes the movement of the foil device, so that the movement of the foil device occurs under control. In particular, the braking force can be regulatable or adjustable by variation of a force of attraction in dependence on the speed of the floating body and/or on the position of the foil or retaining device. For this, the control unit has corresponding means for recognizing a position of the foil device or the retaining device, such as a rotary angle encoder or end position switch, means for actuating the braking device, such as an electrical, electro-magnetic, hydraulic and/or pneumatic actuator, and preferably electrical and/or electronic signal generators, which process the information provided by the respective sensors, especially the speed above ground or through water.

For a power outage, the braking device is designed such that the movement of the retaining device is blocked in the no power position. For this, a brake disk or a brake lining or another part of the braking device producing a blocking can be pressed by means of a spring element or another element generating a force against an otherwise movable part, such as the rotary housing.

Especially preferably, the retaining device comprises at least one further link. In particular, the first link and the further link are situated one behind the other in the direction of movement, at least in the operating position of the foil device. Alternatively or additionally, the first link and/or the second link is/are arranged in a swiveling manner in particular on the floating body and/or on the foil device or a unit or mount rigidly connected to it. In particular, at least one of the links is thus arranged in a swiveling manner on a mount for the at least one foil device or a mount of the foil device. The swivel axes are oriented in particular transversely to the direction of movement and in operation parallel to the water surface. In this way, the retaining device can be configured as a parallelogram linkage, which is especially reliable and by means of which the supporting device remains beneath the floating body also especially in the resting and/or starting position.

Alternatively or additionally, the retaining device preferably comprises further links, each of which is coupled to one of the two links and at least in the operating position adjoin each other between the floating body and the foil device and transmit force to each other. In particular, the two first links and the further links can swivel relative to each other, so that a bent lever or folding mechanism can be produced as the retaining device. For example, each time two links configured as a bent lever are arranged one behind the other in the direction of movement.

In one advantageous embodiment of the invention, the water sports device has at least one depth and/or proximity sensor, which is connected to a control unit designed to control the drive (of the retaining device). The sensor is designed in particular to measure the depth of submergence of the water sports device or a component of the device and/or to measure the distance of the water sports device from the bottom of the water. Alternatively or additionally, the sensor or one of the sensors is designed to measure the distance of the water sports device from an obstacle, especially from any other water sports devices, preferably in the direction of movement. The drive is configured in particular such that, depending on the sensor data, especially during the forward movement of the water sports device, the distance of the foil device from the floating body is varied, preferably during movement, and in particular the foil device is moved at least partly in the direction of the resting and/or starting position or from this position into an operating position. In this way, damage to the water sports device from touching bottom, especially near the shore or beach, and unintentional riding situations such as having the floating body too far from the water surface, can be avoided, and the user is assisted in the use of the water sports device. Preferably, therefore, the foil device is driven out automatically and/or when enabled by the user after a start near shore or the beach when a sufficient water depth is present and it is then brought back in accordingly during the return.

The sensor is arranged in particular on the foil device or the mount or the floating body. Preferably the sensor comprises at least one ultrasound transducer. In this way, spacings or distances can be determined especially reliably under water.

Alternatively or additionally to a depth sensor, with which the depth of submergence of the water sports device is detected, one modification of a water sports device according to the invention comprises at least one movement status sensor for determining the distance of the floating body from the water surface. The depth and movement status sensor can also be configured by a single sensor or a single sensor arrangement.

In particular, the movement status sensor is a sensor unit integrated preferably in a link of the retaining device or arranged on it or them. For example, it can be a capacitive sensor strip extending along a link of the retaining device or integrated in it over the length of the link. Likewise, it may be a sensor unit with a plurality of sensors, particularly capacitive sensors, which are spaced apart from each other along the retaining device and arranged for example in or on its link. Thanks to the sensor data, given a known position of the retaining device or its link, the control unit can infer the distance of the floating body from the water surface and in particular, in combination with further sensor data, such as the speed of movement and/or the depth of the water, bring about a desired riding condition, for example, by raising or lowering the floating body by means of an adjusting of one or more foils or by activating the retaining device or by changing the speed of movement. Of course, such a movement status sensor, which is arranged as a single sensor or a sensor unit comprising a plurality of sensors in the retaining device or on it, can also be used for retaining devices which are rigidly arranged on the floating body, where the retaining device holds the foil device in the same position to the floating body both in the operating position and in the resting and/or starting position.

In particular, the movement status sensor is laminated, and the link of the retaining device comprising the sensor is preferably made from a fiber composite material, so that a stable construction of the link is achieved on the one hand, and on the other hand the integration of the movement status sensor is simplified at the same time. With printing processes such as silk screening, dispensing, or inkjet printing, tailor-made sensor structures can be applied directly onto the fleece or fabric being used, and the movement status sensor becomes an integral part of the structure of the retaining device by integration of the imprinted fleece or fabric in the layered structure and subsequent production of the fiber composite, e.g., by vacuum infusion.

A water sports device outfitted with a movement status sensor, especially one in the form of a hydrofoil board, preferably comprises an optical display unit, which extends in particular over at least half the length of the top side of the floating body and which is designed in particular to display the distance of the floating body from the water surface, for which purpose the display unit has one or preferably more lighting means. Preferably the distance from the water surface can be correlated for example with the number of points of light of the lighting means of the display unit. In particular, RGB diodes can be used for this. For example, when the floating body is lying on the water, no lighting means or only a few of them, such as red lighting means, will light up, and the further the distance becomes the number and/or color of the shining lighting means will change along the length of the floating body, until in a desired condition a given number, such as the maximum number, of points of light will be activated. For example, a particular desired or optimal distance from the water surface can be indicated by predominantly or exclusively green shining lighting means in the form of, e.g., RGB LEDs or LED units.

According to one advantageous embodiment of the invention, the control unit is designed to generate control signals based on signals of the sensor arrangement, especially sensors for position determination, for purposes of geofencing. Geofencing means the limiting of the operating region of the water sports device on the basis of navigation data. When it is determined in the control unit on the basis of data, for example that of a position sensor, that a predeterminable region has been or is about to be exited, the drive power of a propulsion device can be reduced, for example, or the foil device can be transferred to a resting and/or starting position.

Preferably, the propulsion device and the control unit are designed in particular for automatic thrust control, and further in particular for automatic thrust vector control. In this way, an additional control capability is made available to the user, so that for example especially tight curves can be negotiated or even jumps can be performed.

In an automated embodiment, an active self-stabilization of the water sports device especially in the operating position results in connection with position sensors in particular, such as gyrometers. In an active self-stabilization, the control unit thus equalizes any irregularities by sending control commands to at least one actuator of the water sports device, actuators being active positioning means. This may be a motor of the propulsion device, adjustable flaps or nozzles, or adjustable fins, rudders, foils, or individual adjustable sections of these. In the control unit, input variables are evaluated, such as data on the attitude of the water sports device, the power of the propulsion device, the velocity, acceleration and/or user input, and control commands for one or more actuators are generated, by which the adjustable means are activated. In this way, beginners in particular will more quickly enjoy a better riding experience. In particular, the control unit is designed for active self-stabilization of the water sports device by means of the thrust vector control during the transition to the operating position and/or when the floating body lifts off from the water surface, since there are major influences acting on the user during these phases.

Preferably, the water sports device comprises a propulsion device provided for its propulsion, the propulsion motor of which situated at the floating body side is connected in a driving manner by an angle-movable and/or length-movable drive train to a propulsion element located underwater, especially a propulsion element configured as a propeller or impeller. In this way, the foil device has a more streamlined form under water.

Preferably, the propulsion device comprises a swiveling propeller, at least one swiveling guide vane and/or a plurality of nozzles swiveling in different directions, so that by means of the propulsion device the foil and/or retaining device and thus the water sports device can be steered. In a further exemplary embodiment, the entire portion of the propulsion device located under water can also be steerable.

Furthermore, there is added comfort, especially when multiple users are using the same water sports device, when multiple selectable user profiles are saved in the control unit. For example, the user profile may include a predeterminable maximum speed, a height above the water or a maximum distance from an operating station or base.

Preferably, a water sports device according to the invention in a modification of the invention is provided with a control unit, which is designed to communicate with a control unit of another propulsion device of the same or another water sports device and in particular it is designed to generate control signals for one or both propulsion devices based on the position, control and/or driving signals or data relayed by the other water sports device. In this way, for example, a course instructor can show a course participant specifically how to ride a corresponding water sports device, competitions can be held for two users, and in general at least two water sports devices can be operated next to each other in a coordinated mode, e.g., as regards maximum speed or distance from one another.

In another modification according to the invention, the water sports device is characterized in that the control unit is associated with a headset comprising at least one head sensor to pick up movements of at least part of the head of a person located on the water sports device in operation. In this way, the arms and legs can be moved freely for balancing, without holding any steering means in the hands. For example, the speed of propulsion can be increased or decreased by specific and previously determined or determinable movement sequences, which can be dictated by the control unit or can be learned by it, for example, repeated nodding or shaking of the entire head. For the recognizing of this movement, the headset has for example an acceleration sensor as the head sensor.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Individual technical features of the exemplary embodiments described below can also result in modifications of the invention in combination with the features of the independent claim. Where advisable, functionally equivalent parts are given identical reference numbers.

Figure 3:
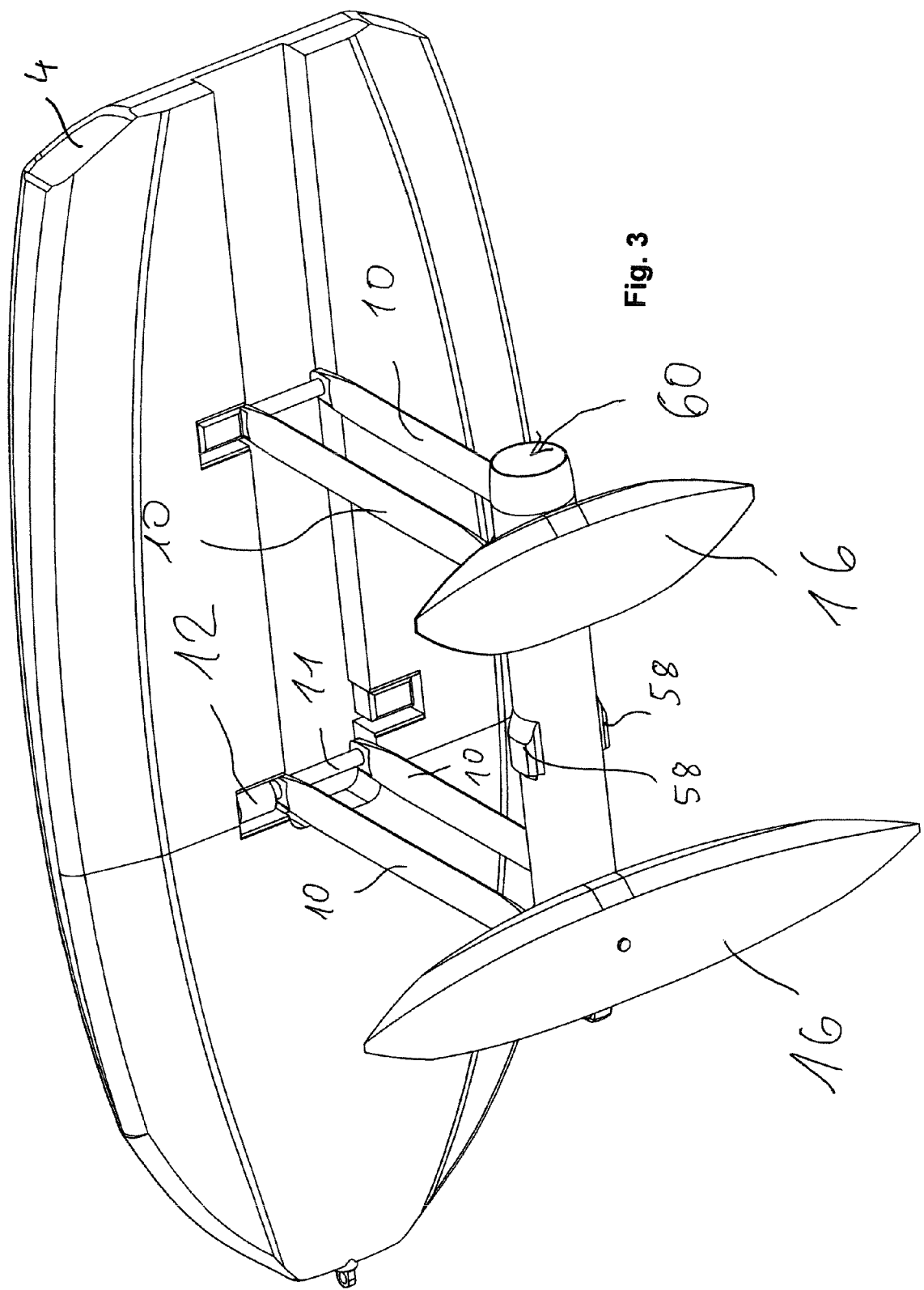
FIG. 3 illustrates the object of FIG. 1 in a perspective representation from below.

A water sports device 2 according to the invention comprises a floating body 4, which is connected by a foil device 6 to a retaining device 8. The foil device 6 comprises multiple links 10, which at one end are hinged to the floating body 4 and at the other end are hinged to the foil device 6. The front links 10 in the direction of movement F, arranged on a common shaft 11, are moved by a drive 12 (cf. FIG. 3). The rear links 10 in the direction of movement F are forcibly guided via the coupling by means of a propulsion device 50 of the foil device 6. Accordingly, only a single properly dimensioned drive 12 is needed.

Figure 1:
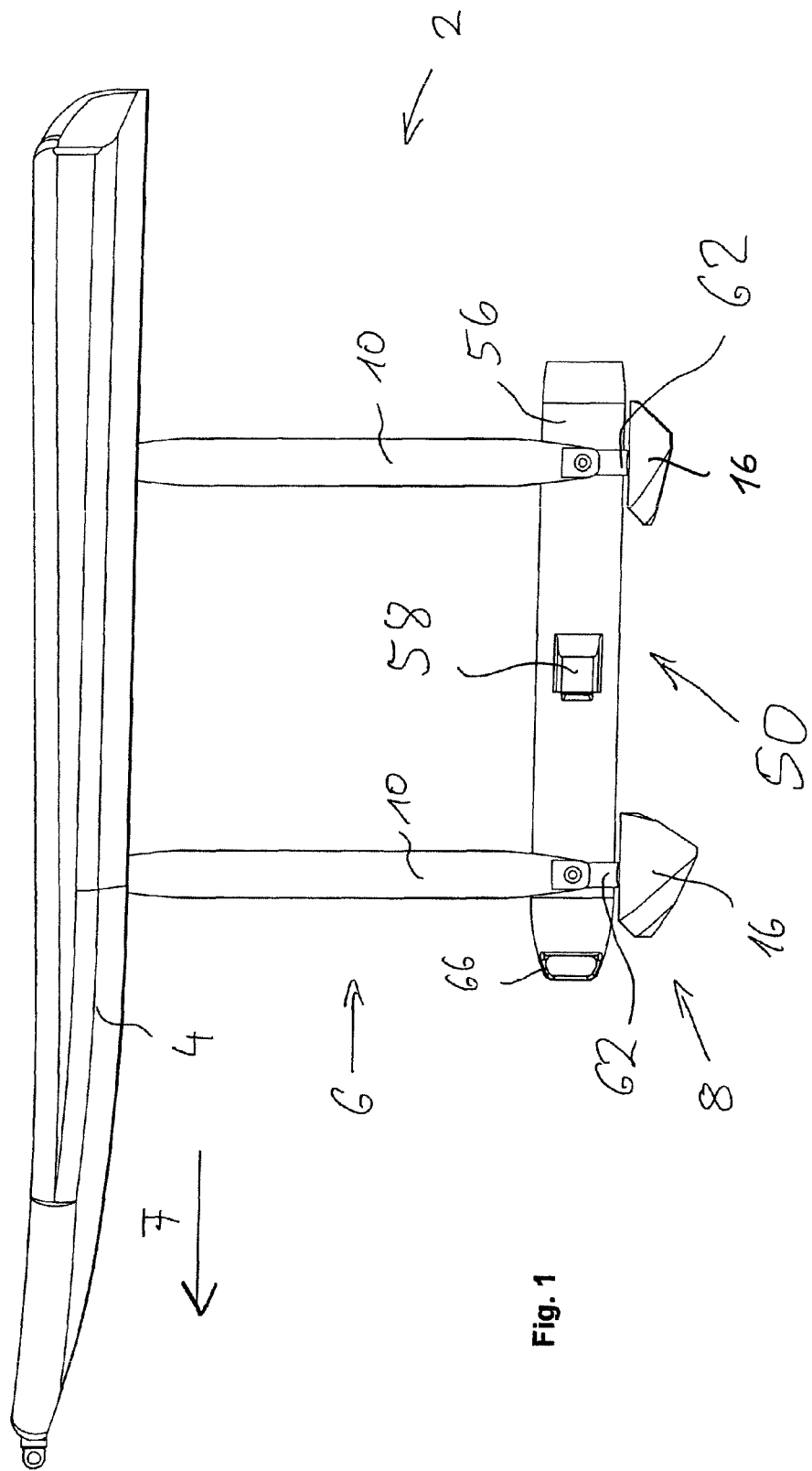
FIG. 1 is an object according to the invention in a side view.

The links 10 are streamlined, having a lesser extension looking in the direction of movement F than transversely to this (FIG. 1). Furthermore, the onflow surfaces are rounded and the links are teardrop- or wing-shaped in particular in cross section.

Figure 2:
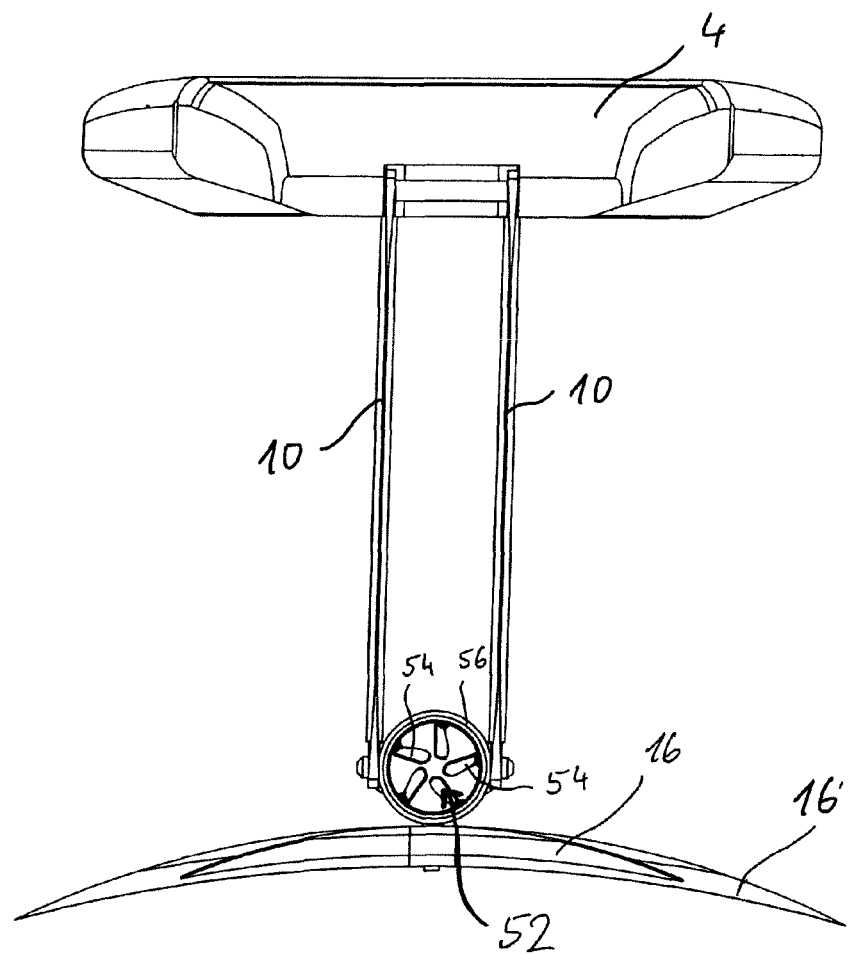
FIG. 2 illustrates the object of FIG. 1 in a rear view.

The propulsion device 50 in the present instance is configured with a hubless impeller 52 (FIG. 2). The corresponding motor comprises a rotor, forming with its inner side the flow duct and being accordingly hollow, with the blades 54 arranged firmly on the inner side of the rotor. The rotor is mounted outside the flow duct on its outer side facing away from the flow duct and runs in a stator, which is arranged in a propulsion body housing 56.

Two sideways projecting housing walls 58 (cf. FIGS. 1 and 3) bound two openings configured as inlet openings, through which the water accelerated and ejected through the outlet opening 60 reaches the interior flow duct. The propulsion device comprises the propulsion body housing 56, secured in two mounts 62 and having an interior propulsion energy accumulator, the motor designed as an internal rotor motor including hubless impeller, and a not otherwise illustrated control unit, which is configured with a man/machine interface for operating the propulsion device 50. Corresponding conductor means lead for example through the links 10 into the floating body 4 and from there they are transmitted wirelessly, for example, to a hand device of the user operating the water sports device.

By using such a control unit or interface, it is possible for example to trigger or permit the transition of the foil device 6 with its foils 16 from the illustrated operating position into a starting and/or resting position of the foil device 6, closer to the floating body 4.

Figure 4:
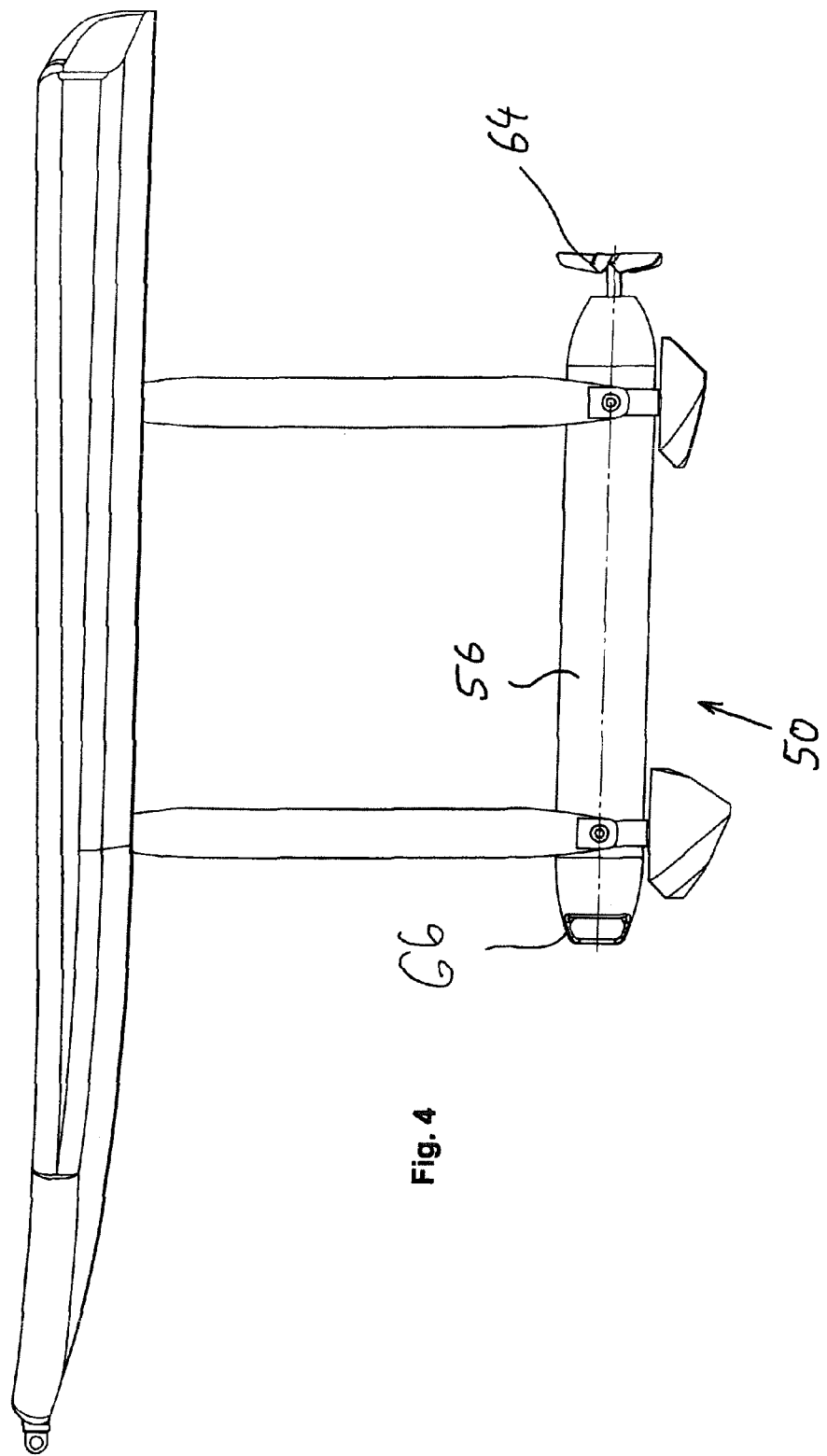
FIG. 4 is a further object according to the invention in a side view.

The exemplary embodiment of FIG. 4 has a very similar configuration, but the propulsion device 50 comprises a propeller 64 instead of an impeller located in a flow duct. The propeller 64 is driven by a motor situated in the propulsion body housing 56. Both this exemplary embodiment and that of FIGS. 1 to 3, as well as the following exemplary embodiments, comprise propulsion devices 50 having a propulsion energy accumulator situated in front of the motor in the direction of movement F. This is arranged on the inside between the propeller 64 and the handle 66 in the propulsion body housing 56. By unscrewing the handle 66, the propulsion energy accumulator designed as a storage battery can be reached in the propulsion body housing 56.

Figure 5:
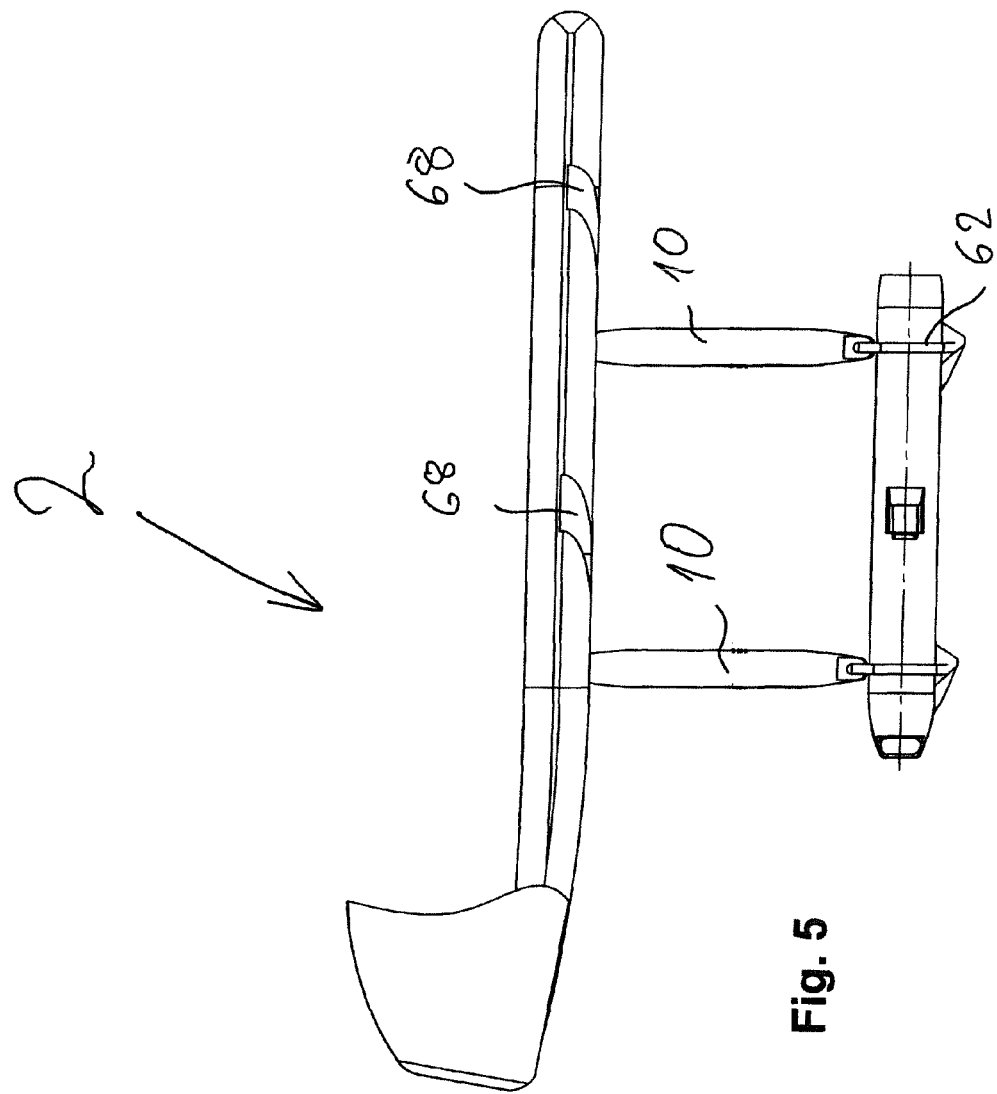
FIG. 5 is a further object according to the invention in a side view.
Figure 6:
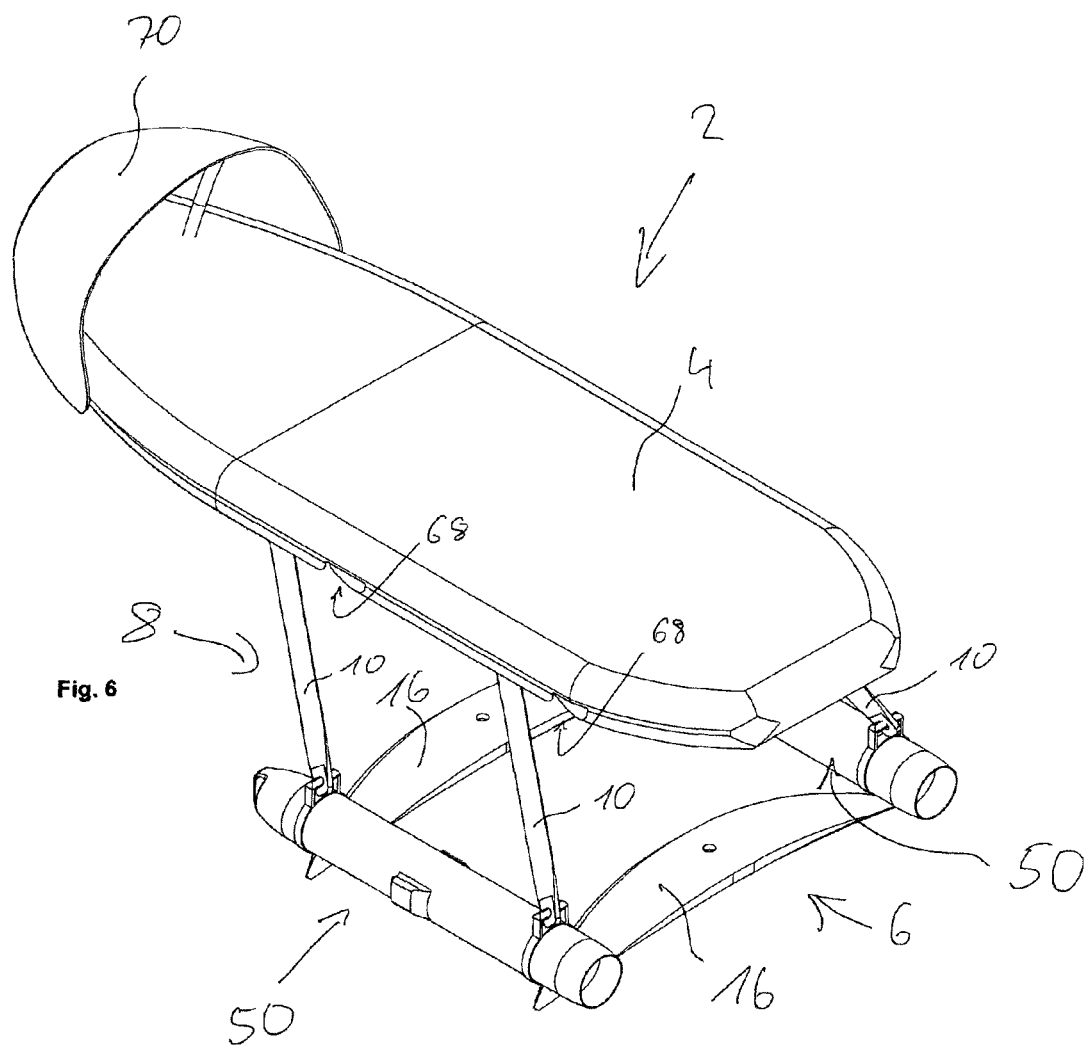
FIG. 6 illustrates the object of FIG. 5 in a perspective representation from above.
Figure 7:
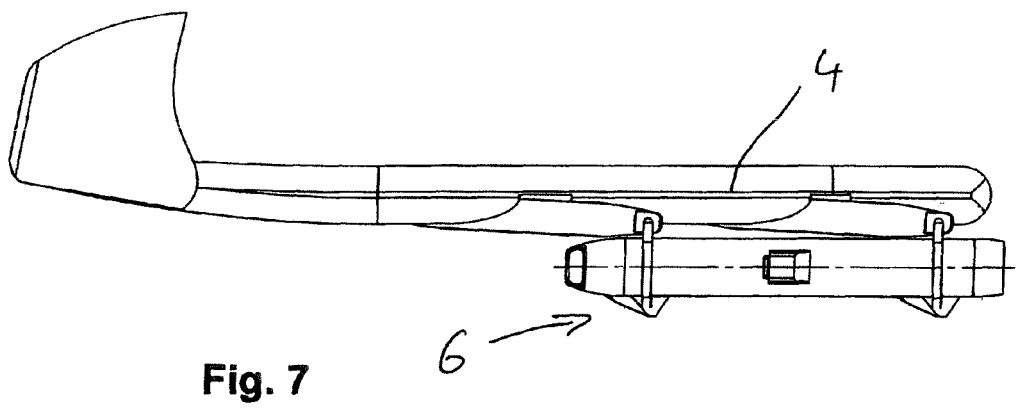
FIG. 7 illustrates the object of FIG. 5 in the resting and/or starting position.

Exactly as in the exemplary embodiments of FIGS. 1 to 4, the exemplary embodiment of FIGS. 5 to 7 is configured such that the foil device 6 can be transferred by means of the retaining device 8 from the operating position shown in FIG. 6 into a starting and/or resting position of the foil device 6, close to the floating body 4.

A corresponding drive 12 is also arranged in the floating body 4 for this transfer from the starting and/or resting position into the operating position shown in FIG. 6 and back. By contrast with the exemplary embodiments of the previous figures, however, the links of the variant in FIGS. 5 to 7 are spread apart downwards from a vertical longitudinal center plane, so that they are arranged in lateral recesses 68 for the links 10 during the transfer from the operating position in FIG. 6 into the attitude or position of FIG. 7. In this way, the foil device 6 can be brought even closer to the floating body 4 and the propulsion device 50 can be used already in shallow waters.

Given the power of 5 KW provided each time by the propulsion devices 50 and the corresponding speed, the water sports device 2 of FIGS. 5 to 7 can be provided with a shield 70 for movement in the operating position, when the floating body 4 has been lifted off from the water surface and only a lower portion of the retaining device 8 as well as the foil device 6 with its foils 16 between the propulsion devices 50 is still in the water, affording protection against wind and waves also in near-surface displacement or gliding movement of the floating body.

Figure 8:
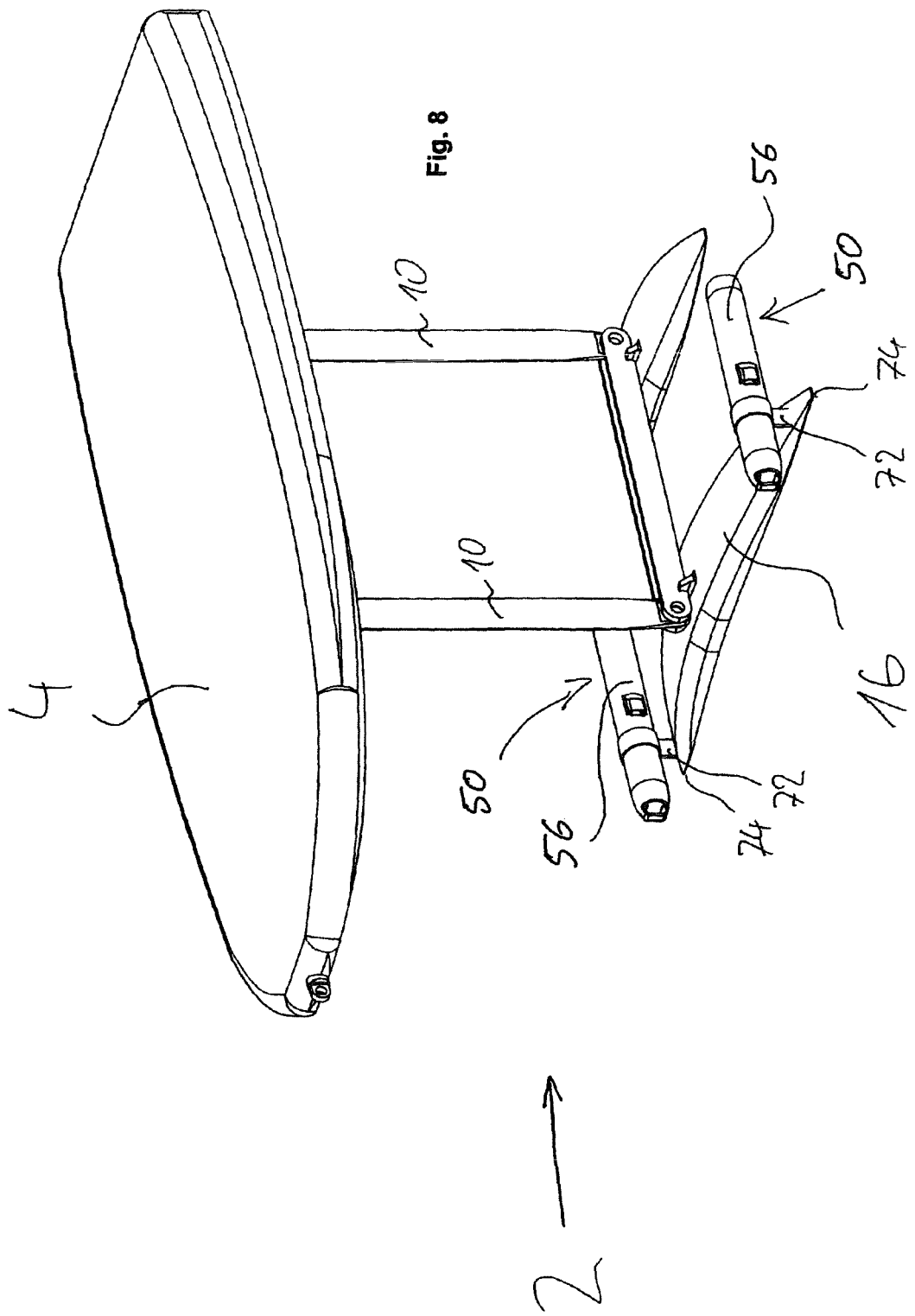
FIG. 8 is a further object according to the invention in a perspective view.

Somewhat smaller and less powerful propulsion devices 50, for example with 3 KW, are situated each time at the end of the front foil 16 in the direction of movement in the exemplary embodiment of FIG. 8. Both propulsion devices 50 are each outfitted with an impeller and thus correspond in construction to the propulsion device of FIGS. 1 to 3. So as to affect as little as possible the flow around the front foil 16, the propulsion devices 50 are each arranged by spacers 72 close to the wing tips 74 in the end region of the foil 16. Thanks to the arrangement as close as possible to the wing tips 74, i.e., spaced apart from the vertical longitudinal center plane, intersecting the two links 10, within 20 cm from the respective wing tip 74, the device is further stabilized during movement in the operating position. At the same time, as in the case of the exemplary embodiment of FIGS. 5 to 7, the negotiating of curves can be supported by a differential actuating of the propulsion devices 50. Since the water resistance is reduced at the same time thanks to the only two links 10 being arranged one behind the other in the direction of movement, especially high speeds result for the water sports device of FIG. 8 and the propulsion devices 50 can have a reduced-power design. At the same time, this also reduces the current consumption handled by any storage batteries situated in the propulsion device 50. These can then be designed smaller in terms of design space and/or be designed for a longer operation.

Figure 9:
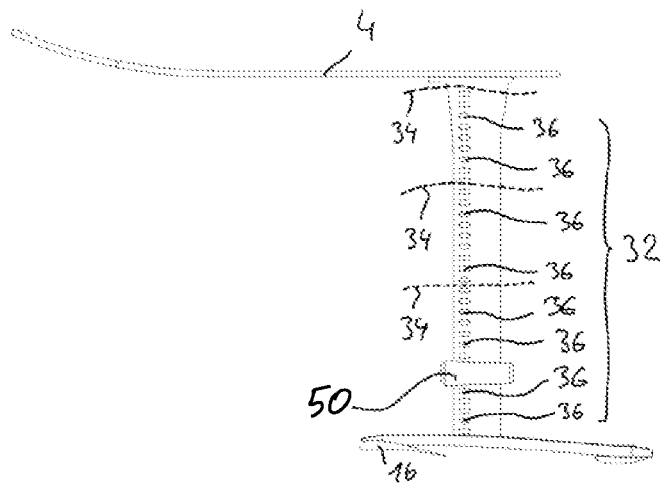
FIGS. 9 and 10 illustrate a further object according to the invention.
Figure 10:
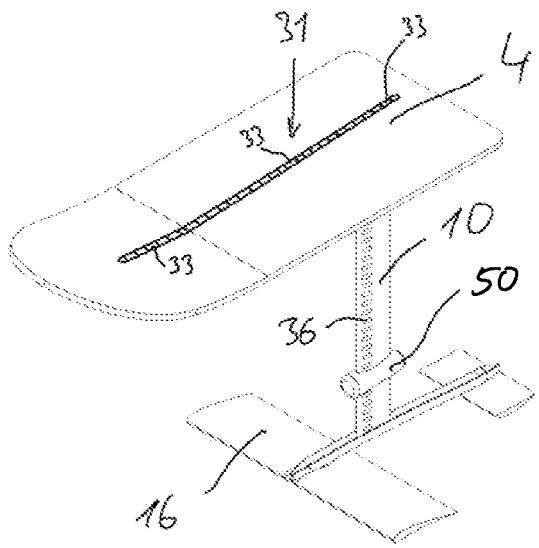

According to another exemplary embodiment according to the invention, a plurality of capacitive sensors 36 are arranged along a link 10 of the retaining device 8 to form a movement status sensor 32 (FIGS. 9 and 10). These extend uniformly over the major portion of the link 10 along its lengthwise dimension and put out corresponding data to a control unit preferably arranged in the floating body 4, depending on whether they are situated above or below a water surface 34 indicated each time by dotted lines. In this way, it is possible to determine a distance of the floating body 4 from the water surface 34, whereupon the control unit in event of undesirable conditions can for example adapt the thrust of the propulsion device 50 which is integrated in the link 10 or the angular attitude of a foil 16.

The exemplary embodiment of FIGS. 9 and 10 furthermore comprises an optical display unit 31 integrated in the floating body, which displays the distance of the floating body 4 from the water surface. The display unit 31 comprises a plurality of laminated multicolored LED units 33, so that the distance from the water surface 34 can be depicted through the number and/or wavelength of the shining LED units 33.

The invention claimed is:

1. A water sports device comprising:
 a floating body;
 a foil device;
 a retaining device securing the floating body with the foil device;
 at least one propulsion device which has at least one motor, wherein the at least one propulsion device can be controlled by a control unit and which is provided for propelling the water sports device;
 an electric terminal or inductive terminal zone for the charging of a propulsion energy accumulator;
 wherein the foil device, arranged on a link of the retaining device, has one or more foils and the foil device can be transferred via the retaining device from a resting and/or starting position close to the floating body into an operating position below the floating body,
 wherein the floating body in the operating position and during a forward movement can be moved by an uplift force produced by the foil device into a position in which it is distant from a water surface.

2. The water sports device as claimed in claim 1, wherein the propulsion device comprises at least one shaftless and/or hubless impeller or propeller, wherein the impeller is connected by at least two openings to the surroundings.

3. The water sports device as claimed in claim 2, wherein the motor comprises a hollow rotor, forming with its inner side a flow duct, wherein the motor further comprising carrying blades as well as an outer stator arranged in a propulsion body housing.

4. The water sports device as claimed in claim 3, wherein the rotor comprises permanent magnets situated alongside each other in the circumferential direction, being secured to the rotor in particular by a bearing ring.

5. The water sports device as claimed in claim 1, wherein a sideways projecting housing wall of the propulsion body housing or a propulsion body housing forms a water inlet.

6. The water sports device as claimed in claim 1, wherein the propulsion device is removably secured to a mount of the foil device.

7. The water sports device as claimed in claim 1, further including a handle of the propulsion device, which handle covers a recess of the propulsion body housing.

8. A water sports device comprising:
 a floating body;
 a foil device;
 a retaining device securing the floating body with the foil device;
 at least one propulsion device which has at least one motor, wherein the at least one propulsion device can be controlled by a control unit and which is provided for propelling the water sports device;
 wherein the foil device, arranged on a link of the retaining device, has one or more foils and the foil device can be transferred via the retaining device from a resting and/or starting position close to the floating body into an operating position below the floating body, wherein the floating body in the operating position and during a forward movement can be moved by an uplift force produced by the foil device into a position in which it is distant from a water surface
 wherein a propulsion energy accumulator also forming an outer contour of the water sports device is removably secured to the rest of the water sports device.

9. The water sports device as claimed in claim 1, further including an accumulator sensor to monitor the propulsion energy accumulator, the water sports device being designed to reduce the power or switch off the propulsion device based on the signal of the accumulator sensor.

10. The water sports device as claimed in claim 1, further including a communication unit arranged in or on the floating body.

11. The water sports device as claimed in claim 1, wherein the propulsion device can be operated both in the resting and/or starting position and in the operating position.

12. The water sports device as claimed in claim 1, wherein the floating body comprises at least one propulsion body mount and/or recesses for the retaining device.

13. The water sports device as claimed in claim 1, further including two propulsion devices.

14. The water sports device as claimed in claim 13, wherein a wing of the foil device extends between the two propulsion devices.

15. The water sports device as claimed in claim 1, wherein the control unit is arranged in or on the retaining or foil device.

16. The water sports device as claimed in claim 1, wherein the water sports device comprises at least one sensor from a group made up of gyro sensors, velocity sensors, position sensors (GPS, Glonass, Beidou etc.), distance sensors (echo sounder, sonar), infrared sensors and tilt sensors.

17. The water sports device as claimed in claim 16, wherein the control unit is designed to process the signals of the sensors.

18. The water sports device as claimed in claim 1, wherein the retaining device comprises a drive, by which the foil device can be moved from a resting and/or starting position into the operating position and/or from the operating position into the resting and/or starting position.

19. A water sports device comprising:
a floating body:
a foil device;
a retaining device securing the floating body with the foil device, the retaining device comprising a drive, by which the foil device can be moved from a resting and/or starting position into the operating position and/or from the operating position into the resting and/or starting position;
at least one propulsion device which has at least one motor, wherein the at least one propulsion device can be controlled by a control unit and which is provided for propelling the water sports device;
wherein the foil device, arranged on a link of the retaining device, has one or more foils and the foil device can be transferred via the retaining device from a resting and/or starting position close to the floating body into an operating position below the floating body,
wherein the floating body in the operating position and during a forward movement can be moved by an uplift force produced by the foil device into a position in which it is distant from a water surface;
wherein the drive comprises an energy accumulator, wherein the energy accumulator having at least one spring can be tensioned.

20. The water sports device as claimed in claim 19, wherein the drive comprises a gear unit, by which the drive motor of the drive is connected to the energy accumulator.

21. The water sports device as claimed in claim 18, wherein the water sports device comprises a braking device which releases and/or brakes the movement of the foil device.

22. The water sports device as claimed in claim 1, wherein the propulsion device is designed for thrust control.

23. The water sports device as claimed in claim 1, wherein the motor of the propulsion device, situated at the floating body side, is connected in a driving manner by an angle- and/or length-movable drive train to a propulsion element located underwater.

24. The water sports device as claimed in claim 16, wherein the water sports device includes a sensor arrangement usable for position determination and the control unit is designed to generate control signals based on signals of the sensor arrangement for purposes of geofencing.

25. The water sports device as claimed in claim 1, wherein the control unit is designed to communicate with a control unit of another propulsion device of the same or another water sports device and is designed to generate control signals for one or both propulsion devices based on the position, control and/or driving signals or data relayed by the other water sports device.

26. The water sports device as claimed in claim 1, wherein the control unit is associated with a headset comprising at least one head sensor to pick up movements of at least part of the head of a person located on the water sports device in operation.

27. The water sports device as claimed in claim 1, further including at least one movement status sensor to determine the distance of the floating body and/or the foil device from the water surface.

28. The water sports device as claimed in claim 1, further including an optical display unit.

29. The water sports device as claimed in claim 8, further including an accumulator sensor to monitor the propulsion energy accumulator, the water sports device being designed to reduce the power or switch off the propulsion device based on the signal of the accumulator sensor.

30. The water sports device as claimed in claim 8, further including an accumulator sensor to monitor the propulsion energy accumulator, the water sports device being designed to reduce the power or switch off the propulsion device based on the signal of the accumulator sensor.

* * * * *